United States Patent
Kanematsu et al.

(10) Patent No.: US 6,527,881 B2
(45) Date of Patent: Mar. 4, 2003

(54) METHOD FOR PRODUCING A TIN-NICKEL ALLOY FILM

(75) Inventors: Hideyuki Kanematsu, Suzuka (JP); Yoshihiko Masuo, Anjo (JP); Takeo Oki, Tsushima (JP)

(73) Assignee: Suzuka National College of Technology, Suzuka (JP)

( * ) Notice: Subject to any disclaimer, the term of this patent is extended or adjusted under 35 U.S.C. 154(b) by 0 days.

(21) Appl. No.: 09/862,459

(22) Filed: May 23, 2001

(65) Prior Publication Data

US 2002/0069943 A1 Jun. 13, 2002

(30) Foreign Application Priority Data

Dec. 12, 2000 (JP) .......................... 2000-377157

(51) Int. Cl.$^7$ .............................. C21D 1/70; C21D 9/00
(52) U.S. Cl. ....................... 148/525; 148/565
(58) Field of Search ........................ 428/669; 148/525, 148/565

(56) References Cited

U.S. PATENT DOCUMENTS 4,495,255 A * 1/1985 Draper et al. ................ 219/121

OTHER PUBLICATIONS

Matsuyoshi, H., *Development of Sn–Ni alloy film having large oxidation resistance at higher temperature*, The Surface Finishing Society of Japan, Sep., 2000.

Sonoda, T., et al., *Structure and Properties of Bright Tin–Nickel Alloy Films Formed By Thermal Diffusion Method*, The Surface Finishing Society of Japan, vol. 45, No. 2, 1994, pp. 197–201.

Yoshimura, S., et al., *Corrosion Resistance of Tin–Nickel Alloy Films Formed by Heating Diffusion Treatment*, The Surface Finishing Society of Japan, vol. 44, No. 2, 1993, pp. 176–178.

*Alloying of a Ni–Sn multiplayer on an iron plate through thermal process*, May, 2000.

Kanematsu, H., et al., *Thermal Alloying of Tin/Nickel Films as Substitutes for Chromium Plating*, Proceedings AEST SUR/FIN® 2000, Annual International Technical Conference, Jun., 2000, pp. 842–847.

Hino, M., et al., *Optimum Conditions for the Alloying of Zn/Ni Double–Coated Film by YAG Laser Irradiation*, vol. 44, No. 11, 1993, pp. 933–937.

* cited by examiner

*Primary Examiner*—Deborah Yee
(74) *Attorney, Agent, or Firm*—Burns, Doane, Swecker & Mathis, LLP

(57) ABSTRACT

A tin layer and a nickel layer are stacked sequentially on a given substrate to form a multilayered film composed of the tin layer and the nickel layer. Then, laser beams are irradiated onto the multilayered film to form a tin-nickel alloy film, having stable phases composed of equilibrium phases such as $Ni_3Sn$ phase through the diffusion of the tin elements of the tin layer into the nickel layer.

12 Claims, 2 Drawing Sheets

METHOD FOR PRODUCING A TIN-NICKEL ALLOY FILM

BACKGROUND OF THE INVENTION (1) Field of the Invention

This invention relates to a method for producing a tin-nickel alloy film, particularly a method for producing a tin-nickel alloy film for decorative purposes.

(2) Description of the prior art

Recently, attention has been paid to a tin-nickel alloy film to replace a decorative chromium plating film. Although the chromium plating film has some excellent properties such as wear-resistance and corrosion-resistance, it is strictly restricted in use because it has harmful element, Cr for environment. The use of the chromium plating film would be more severely restricted in future. Therefore, the tin-nickel alloy film would play very important roles in the future instead of the chromium plating film.

In the past, the tin-nickel film would be produced from a given water solution by alloy-electroplating, and thus, two different metals, tin and nickel, must be electroplated at the same voltage. Then, all kinds of things to perform the electroplating at the same voltage have been carried out. Moreover, chemical species to be used have been restricted, and anti-environmental additives have been used.

Furthermore, the above electroplated tin-nickel film from the water solution always has a non-equilibrium NiSn phase which is not recognized in its equilibrium diagram. The NiSn phase often shifts to another stable phase due to the wear or the heating in the use of the tin-nickel alloy film, and thus, the properties of the tin-nickel alloy film often change. Therefore, the functions given to the tin-nickel alloy film for predetermined purposes may change during the use of the film, so that it may be that the tin-nickel alloy film can not exhibit the predetermined functions.

In the above case, various modifications in electroplating condition and additives have been performed for preventing the occurrence of the unstable NiSn phase, but can not generate another stable phase except the unstable NiSn phase.

SUMMERY OF THE INVENTION

It is an object of the present invention to provide a method for producing a stable tin-nickel alloy film not including the non-equilibrium NiSn phase.

For achieving the above object, this invention relates to a method for producing a tin-nickel alloy film comprising the steps of:

depositing a tin layer and a nickel layer on a given substrate sequentially, thereby to form a multilayered film composed of the tin layer and the nickel layer, and irradiating laser beams onto the multilayered film to form the tin-nickel alloy film.

The inventors have intensely studied to obtain the tin-nickel alloy film not including the non-equilibrium NiSn phase. As a result, they have found out a new method for producing the above tin-nickel alloy film in which films made of tin and nickel, which are the component in the tin-nickel alloy film, are stacked to form a multilayered film, and then, laser beams are irradiated to the multilayered film to diffuse the tin elements and the nickel element into the respective opposite layers, and thus, obtain the tin-nickel alloy film.

According to the present invention, the tin-nickel alloy film is produced in short time through the rapid diffusion of the tin element to constitute the tin-film and the nickel element to constitute the nickel film. Therefore, it can maintain its original properties in use, and the original functions given to the tin-nickel alloy film can be maintained for a long time.

BRIEF DESCRIPTION OF THE DRAWINGS

For better understanding of the present invention, reference is made to the attached drawings, wherein.

DESCRIPTION OF THE PREFERRED EMBODIMENTS

Figure 1:
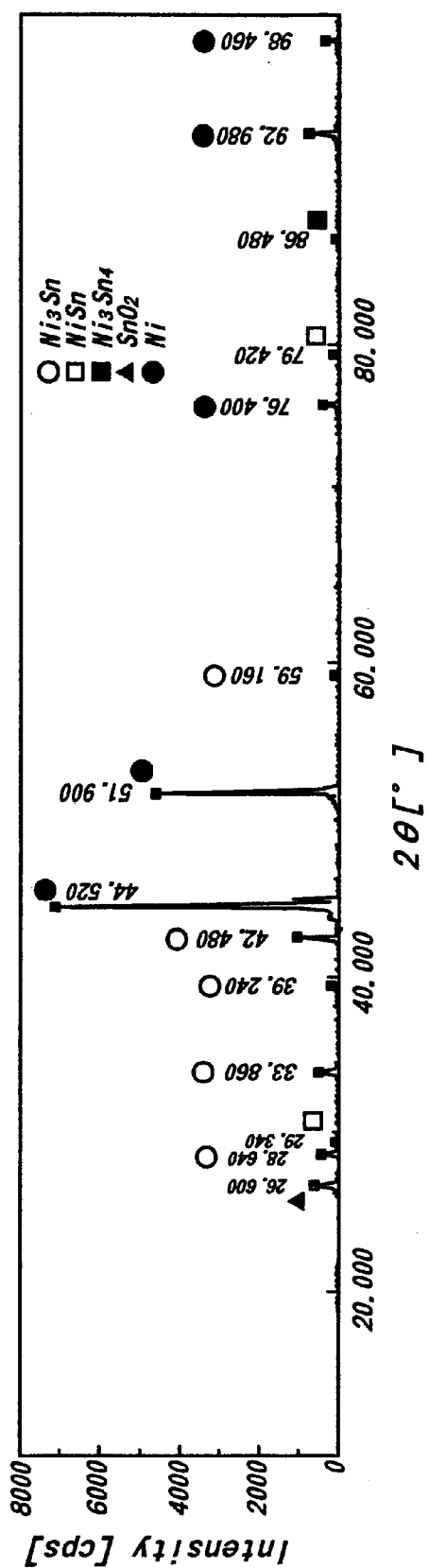
FIG. 1 is a X-ray diffraction profile of a tin-nickel alloy film obtained by the producing method of the present invention, and, FIG. 2 is another X-ray diffraction profile of a tin-nickel alloy film obtained by the producing method of the present invention.
Figure 2:
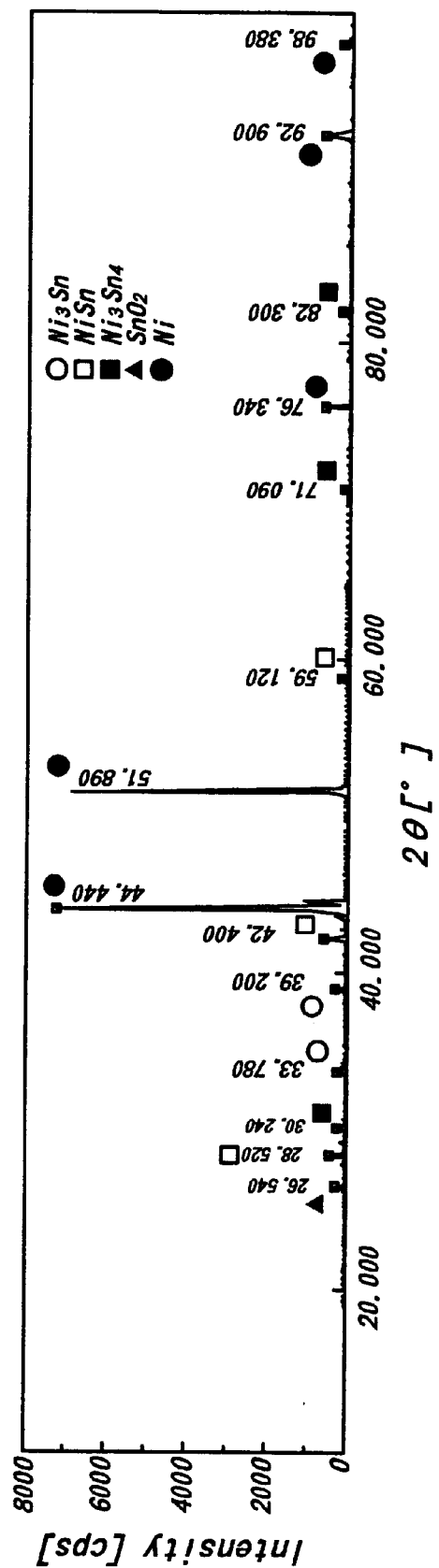

This invention will be described in detail with reference to the accompanying drawings.

In the present invention, it is required that after a multilayered film composed of a tin layer and a nickel layer is formed, laser beams are irradiated to the multilayered film. The intensity of the laser beams is preferably 150 $W/cm^2$ to 500 $W/cm^2$, particularly, 200 $W/cm^2$ to 300 $W/cm^2$. Therefore, the diffusion of the tin element to constitute the tin layer and the nickel element to constitute the nickel layer can be effectively performed precisely.

If the intensity of the laser beams is beyond the above intensity range, some of the tin elements may be evaporated and the diffusion of the tin element and the nickel element may be performed at once. As a result, it may be that the diffusion condition can not be controlled precisely. Moreover, if the intensity of the laser beams is less than the above intensity range, it takes a long time in the diffusion of the tin element and the nickel element, so that it may be that the above desired tin-nickel alloy film can not be obtained.

The irradiation period of the laser beams depends on the laser beam intensity, the thickness of the tin layer and the nickel layer, and the alloy degree of the tin-nickel alloy film to be produced. However, it is desired that the irradiation period is set within 5–60 seconds, particularly 20–60 seconds.

Therefore, the diffusion of the tin element of the tin layer and the nickel element of the nickel layer can be controlled precisely, and thus, the desired tin-nickel alloy film can be produced efficiently. It is surprising that the desired tin-nickel alloy film can be produced in such a short irradiation period.

When the laser beams with the above intensity range is irradiated to the multilayered film made of the tin film and the nickel film, the multilayered film is easily heated to a temperature within the melting point, 232° C. of the tin element and the boiling point, 2632° C. of the tin element in the above short irradiation period. In this case, the tin layer is melted to its liquid phase. Then, the tin liquid diffuses into the boundaries between the nickel particles which constitute the nickel layer, and thus, the tin-nickel alloy having a large alloy degree film can be obtained in a relatively short period.

A gas laser such as a He-Ne laser, a $CO_2$ laser, an Excimer laser and a solid-state laser such as a Nd:YAG laser may be exemplified as a laser source to output the above laser beams.

Moreover, the stacking order of the tin layer and the nickel layer constituting the multilayered film is not particularly restricted, but it is desired to stack the tin layer on the nickel layer.

In the case of forming the nickel layer on the tin layer to form the multilayered film, first of all, the tin layer is electroplated on a given substrate, and thereafter, the nickel layer is formed from a strong acidic bath such as a watts nickel bath. Therefore, the tin layer is immersed into the strong acidic bath for a long time during the formation of the nickel layer. As a result, the tin layer is partially melted and reduced in its thickness.

If the tin-nickel alloy film is formed of the above obtained multi-layered film, the tin content of the alloy film is decreased and the kind of stable phase is restricted. Therefore, for obtaining the tin nickel alloy film having a desired tin content, the tin layer has to be formed thicker by compensating the thickness of the tin layer to be reduced.

On the other hand, if the tin-nickel alloy is formed of the multi-layered film in which the tin layer is stacked on the nickel, the tin layer is not immersed into the strong acidic bath and thus, not reduced in its thickness. As a result, the tin nickel alloy film having a desired tin content can be easily formed.

Moreover, it is preferable that the thickness of the tin layer is 10–50 $\mu$m, and the thickness of the nickel layer is 10–50 $\mu$m. Thereby, the tin-nickel alloy film obtained through the subsequent laser beam irradiation process can have various stable phases.

Then, if the tin layer and the nickel layer have the above thickness, the fluctuation margin in the electroplating condition for forming the above tin layer and nickel layer is allowable to some degree. That is, even though the electroplating condition for forming the tin layer and the nickel layer is fluctuated slightly, the tin layer and the nickel layer can have thicknesses within the above thickness range, respectively.

Although the tin layer and the nickel layer are deposited on a given substrate, the depositing method is not particularly limited. However, the tin layer and the nickel layer are preferably electroplated on the given substrate because the electroplating can form the layers thicker in a relatively short time and the electroplating has its easy operationality.

In forming the tin layer by the electroplating method, an electroplating bath such as an acidic bath or an alkaline bath may be used. A sulfuric acid bath, a methanosulfonic acid bath or a tetrafluoroboric acid bath may be exemplified as the acidic bath. In forming the nickel layer by the electroplating method, an electroplating watts nickel bath may be employed.

The tin-nickel alloy film not including a non-equilibrium NiSn phase can be obtained through the above process according to the present invention. Then, the alloy film has preferably at least one of $Ni_3Sn$ phase, $Ni_3Sn_2$ phase and $Ni_3Sn_4$ phase. Thereby, the properties of the alloy film, that is, the functions given to the alloy film can be maintained for a long time.

EXAMPLE

This invention is concretely described in the following examples, but is not restricted to the examples.

Example 1

A pure iron plate having a thickness of 2 mm as a substrate was immersed into a watts nickel bath having a total amount of 300 ml which was composed of 15 g of nickel chloride-hexahydrate, 90 g of nickel sulphate and 12 g of boric acid, and the watts nickel bath was electrolyzed by flowing a current at a current density of 5 $A/dm^2$ for five minutes to form a nickel layer in a thickness of 30 $\mu$m.

Then, the iron plate having the nickel layer thereon was immersed into a fluoroboric acidic bath having a total amount of 300 ml which was composed of 18 ml of 42%-boric hydrofluoric acid, 2 ml of 44.6%-fluoroboric tin and 15 mg of polyethylene glycol (molecular weight=2000). Then, the fluoroboric acidic bath was electrolyzed by flowing a current at a current density of 1 $A/dm^2$ for five minutes to form a tin layer in a thickness of 30 $\mu$m on the nickel layer and form a multi-layered film composed of the tin layer and the nickel layer.

Laser beams from a $CO_2$ laser was uniformed by a kaleidoscope, and were irradiated onto the surface of the multi-layered film for 20 seconds at an irradiation intensity of 300 W.

FIG. 1 is a X-ray diffraction profile of the tin-nickel alloy film. As is apparent from FIG. 1, peaks from $Ni_3Sn$ stable phase and $Ni_3Sn_4$ stable phase appeared and peaks from a NiSn unstable phase appeared slightly in the tin-nickel alloy film.

As a result, according to the present invention, the long time-reliable tin-nickel alloy film, not almost including the non-equilibrium NiSn phase, can be obtained in a short time.

Moreover, the above phenomenon was observed by an electron beam microanalyzer built-in a scanning microscope.

Example 2

After the multi-layered film, in which the nickel layer and the tin layer are stacked in turn as in Example 1, was formed, laser beams having an intensity of 200 $W/cm^2$ were irradiated onto the multi-layered film for 60 seconds from the $CO_2$ laser, and thus, a tin-nickel alloy film was produced.

As a result, according to the present invention, the long time-reliable tin-nickel alloy film, not almost including the non-equilibrium NiSn phase, can be obtained in a short time.

Moreover, the above phenomenon was observed by an electron beam microanalyzer built-in a scanning microscope.

Comparative Example 1

A pure iron plate was immersed into a bath having a total amount of 300 ml composed of 80 g of nickel chloride-hexahydrate, 17 g of tin chloride-dihydrate, 11 g of ammonium difluoride and 28 g of sodium fluoride. Then, the bath was electrolyzed at 70° C. by flowing a current at a cathode current density of 4 $A/cm^2$ for five minutes to form a tin-nickel alloy film in a thickness of 15 $\mu$m.

When the alloy film was investigated by X-ray diffraction, it was turned out that the alloy film had unstable NiSn phase.

Comparative Example 2

After the multi-layered film, in which a nickel film having a thickness of 30 $\mu$m and a tin film having a thickness of 30 $\mu$m were stacked in turn as in Examples 1 and 2, was formed, it is heated at 200° C. in an electric furnace. As a result, it was turned out that a long time-reliable tin-nickel alloy film having stable phases such as a $Ni_3Sn$ phase was formed in a long heating treatment of 10 days or over.

Although the present invention was described in detail with reference to the above examples, this invention is not limited to the above disclosure and every kind of variation and modification may be made without departing from the scope of the present invention.

As is explained above, according to the present invention, a tin-nickel alloy film not including unstable NiSn phase can be provided in a short time. Therefore, the change in the properties of the alloy film can be repressed regardless of the wear and the heating in use. As a result, the functions given to the alloy film can be maintained for a long time.

What is claimed is:

1. A method for producing a tin-nickel alloy film comprising the steps of:

depositing a tin layer and a nickel layer on a given substrate sequentially, thereby to form a multi-layered film composed of the tin layer and the nickel layer, and irradiating laser beams onto the multi-layered film to melt the tin layer and then form the tin-nickel alloy film through tin liquid diffusion.

2. A method for producing a tin-nickel alloy film as defined in claim 1, wherein the laser beams are irradiated onto the multi-layered film at an intensity of 150 W/cm$^2$–500 W/cm$^2$.

3. A method for producing a tin-nickel alloy film as defined in claim 2, wherein the laser beams are irradiated onto the multi-layered film for 5–60 seconds.

4. A method for producing a tin-nickel alloy film as defined in claim 2, wherein, in the multilayered film, the tin layer is stacked on the nickel layer.

5. A method for producing a tin-nickel alloy film as defined in claim 2, wherein the thickness of the tin layer is 10–50 $\mu$m, and the thickness of the nickel layer is 10–50 $\mu$m.

6. A method for producing a tin-nickel alloy film as defined in claim 2, wherein the tin layer and the nickel layer are deposited by an electroplating method.

7. A method for producing a tin-nickel alloy film as defined in claim 2, wherein the tin-nickel alloy film has at least one of $Ni_3Sn$ phase, $Ni_3Sn_2$ phase and $Ni_3SN_4$ phase.

8. A method for producing a tin-nickel alloy film as defined in claim 1, wherein the laser beams are irradiated onto the multi-layered film for 5–60 seconds.

9. A method for producing a tin-nickel alloy film as defined in claim 1, wherein, in the multi-layered film, the tin layer is stacked on the nickel layer.

10. A method for producing a tin-nickel alloy film as defined in claim 1, wherein the thickness of the tin layer is 10–50 $\mu$m, and the thickness of the nickel layer is 10–50 $\mu$m.

11. A method for producing a tin-nickel alloy film as defined in claim 1, wherein the tin layer and the nickel layer are deposited by an electroplating method.

12. A method for producing a tin-nickel alloy film as defined in claim 1, wherein the tin-nickel alloy film has at least one of $Ni_3Sn$ phase, $Ni_3Sn_2$ phase and $Ni_3SN_4$ phase.

* * * * *